US010943430B2

(12) United States Patent
Petersen et al.

(10) Patent No.: US 10,943,430 B2
(45) Date of Patent: Mar. 9, 2021

(54) REGISTERING A PLAYER ACCOUNT USING THIRD PARTY USER INFORMATION, AND RELATED SYSTEMS, DEVICES, AND METHODS

(71) Applicant: IGT, Las Vegas, NV (US)

(72) Inventors: Erik Petersen, Reno, NV (US); Kevin Higgins, Reno, NV (US); Xiangyu Song, Beijing (CN)

(73) Assignee: IGT, Las Vegas, NV (US)

( * ) Notice: Subject to any disclaimer, the term of this patent is extended or adjusted under 35 U.S.C. 154(b) by 126 days.

(21) Appl. No.: 16/405,655

(22) Filed: May 7, 2019

(65) Prior Publication Data
US 2020/0357231 A1 Nov. 12, 2020

(51) Int. Cl.
*G07F 17/32* (2006.01)
*G06F 16/955* (2019.01)

(52) U.S. Cl.
CPC ........ *G07F 17/3239* (2013.01); *G06F 16/955* (2019.01); *G07F 17/3223* (2013.01)

(58) Field of Classification Search
CPC ............. G07F 17/3239; G07F 17/3223; G06F 16/955; A63F 13/79
See application file for complete search history.

(56) References Cited

U.S. PATENT DOCUMENTS

| 6,852,031 | B1 | 2/2005 | Rowe |
| 2005/0124407 | A1 | 6/2005 | Rowe |
| 2016/0373428 | A1* | 12/2016 | Shi .......................... H04L 63/10 |
| 2017/0069168 | A1* | 3/2017 | Rush .................... G07F 17/3237 |
| 2018/0047249 | A1 | 2/2018 | Nelson |
| 2019/0197526 | A1 | 6/2019 | Higgins et al. |

* cited by examiner

Primary Examiner — Jasson H Yoo
(74) Attorney, Agent, or Firm — Sage Patent Group (57) ABSTRACT

Systems, devices and methods for registering a player account using third party user information include scanning, by a scanning device, an encoded identifier associated with a first server and transmitting a request to access a player account of the player to the first server based on the encoded identifier. In response to an indication that the player account does not exist, the user device causes a second request message to be transmitted to a second server operated by a third party provider to access a user account associated with the player. The second server transfers user information associated with the user account to the first server. The user device next transmits an account registration message, which includes an instruction to create a new player account associated with the player, to the first server. Based on creation of the new player account, the user device accesses the player account.

20 Claims, 6 Drawing Sheets

REGISTERING A PLAYER ACCOUNT USING THIRD PARTY USER INFORMATION, AND RELATED SYSTEMS, DEVICES, AND METHODS

BACKGROUND

Embodiments described herein relate to registering a player account, and in particular to registering a player account using third party user information, and related systems, devices, and methods. Many establishments, such as casino-gaming establishments, offer player accounts or other user accounts, which may include credit accounts for cashless gaming and other transactions. To create these player accounts, many establishments require a user to register in person, such as at a casino club desk. Some establishments may provide the option of installing a mobile app on a user's mobile device, which may require manually entering user credentials and other information, in order to establish a secure connection with establishment hardware, such as electronic gaming machines, electronic kiosk devices, or other devices operated by the establishment operator. These steps that are required by these and other options may act as a barrier to adoption of the player account by users at the establishment.

SUMMARY

According to an embodiment, a system for registering a player account is disclosed. The system includes a processor circuit and a memory coupled to the processor circuit. The memory includes machine-readable instructions that, when executed by the processor circuit, cause the processor circuit to receive, from a scanner device, an encoded identifier comprising a uniform resource locator (URL) associated with a first server. The machine-readable instructions further cause the processor circuit to transmit a first request message to the first server based on the URL. The first request message includes a request to access a player account of a player. The machine-readable instructions further cause the processor circuit to receive a response message from the first server. The machine-readable instructions further cause the processor circuit to, in response to the response message indicating that the player account does not exist, receive player input indicative of a request to access a user account associated with the player. The machine-readable instructions further cause the processor circuit to, based on the player input, cause a second request message to be transmitted to a second server operated by a third party provider to access the user account. The second request message includes an instruction to transfer user information associated with the user account from the second server to the first server. The machine-readable instructions further cause the processor circuit to, based in part on the transfer of the user information to the first server, transmit an account registration message to the first server. The account registration message includes an instruction to create a new player account associated with the player. The machine-readable instructions further cause the processor circuit to, based on creation of the new player account, access the player account.

According to another embodiment, a method for registering a player account is disclosed. The method includes scanning, by a scanning device of a mobile device associated with a player, an encoded identifier comprising a uniform resource locator (URL) associated with a first server. The method further includes transmitting, by the mobile device, a first request message to the first server based on the URL. The first request message includes a request to access a player account of the player. The method further includes receiving, by the mobile device, a response message from the first server. The method further includes, transmitting a second request message to a second server operated by a third party provider to access a user account associated with the player. The second request message includes an instruction to transfer the user information associated with the user account from the second server to the first server. The method further includes, based in part on the transfer of the user information to the first server, transmitting, by the mobile device, an account registration message to the first server. The account registration message includes an instruction to create a new player account associated with the player. The method further includes, based on creation of the new player account, accessing the player account by the mobile device.

According to another embodiment, a system for registering a player account. The system includes a first server including a processor circuit and a memory coupled to the processor circuit. The memory includes machine-readable instructions that, when executed by the processor circuit, cause the processor circuit to receive a first request message from a mobile device. The first request message includes a request to access a player account of a player, and is associated with an encoded identifier comprising a uniform resource locator (URL) that has been scanned by a scanner device of the mobile device. The machine-readable instructions further cause the processor circuit to transmit a response message to the mobile device indicating that the player account does not exist. The machine-readable instructions further cause the processor circuit to receive user information from a second server operated by a third party provider, wherein the user information is associated with a user account associated with the player. The machine-readable instructions further cause the processor circuit to receive the user information from the second server. The machine-readable instructions further cause the processor circuit to receive an account registration message from the mobile device. The account registration message includes an instruction to create a new player account associated with the player. The machine-readable instructions further cause the processor circuit to create the new player account based in part on the user information.

DETAILED DESCRIPTION

Embodiments described herein relate to registering a player account, and in particular to registering a player account using third party user information, and related systems, devices, and methods. In some embodiments, a scanning device of a user device scans an encoded identifier that includes a uniform resource locator (URL) associated with a first server. The user device transmits a first request message, which includes a request to access a player account of the player, to the first server based on the URL. If the player account does not exist, the user device transmits a second request message to a second server operated by a third party provider to access a user account associated with the player. The second request message includes an instruction to transfer the user information associated with the user account from the second server to the first server. Based on the transfer of the user information to the first server, the user device transmits an account registration message, which includes an instruction to create a new player account associated with the player, to the first server. Based on creation of the new player account, the user device accesses the player account.

One advantage of these and other embodiments is that a player can register a player account by accessing user information associated with an already-existing third party account, such as an Internet account or social media account. By allowing registration without requiring installation of an app or other software by a player or manually inputting the user information, these embodiments provide a unique technical solution to the technical problem of reducing the difficulty of registering a player account while maintaining security for the player account.

Figure 1:
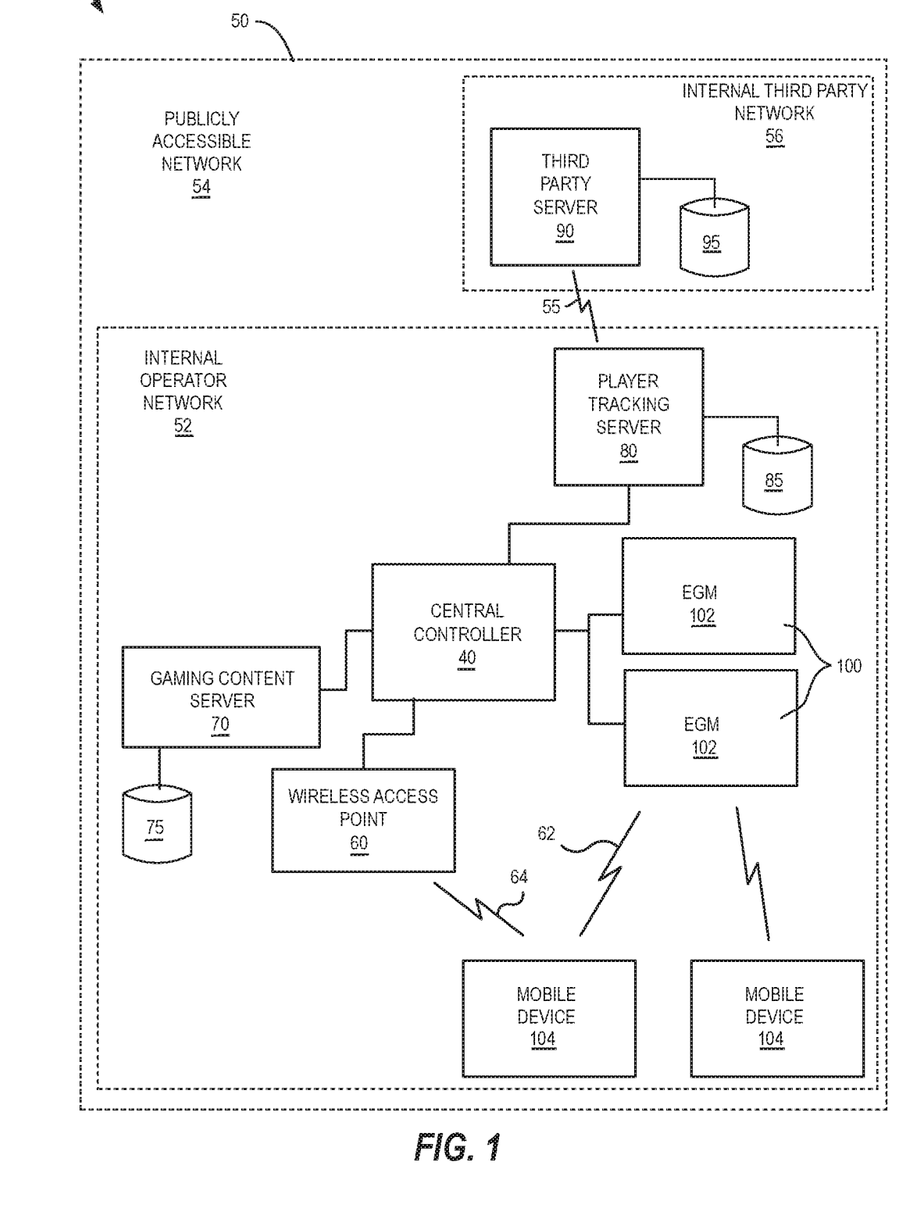
FIG. 1 is a schematic block diagram illustrating a network configuration for a plurality of gaming devices and mobile devices in communication with a third party server and network, according to some embodiments.

In this regard, FIG. 1 illustrates a system 10 including a plurality of gaming devices 100, such as electronic gaming machines 102. The system 10 may also include a plurality of mobile devices 104 which may be mobile gaming devices, for example, and which may be configured to communicate with other components of the system 10. The system 10 may be located, for example, on the premises of a gaming establishment, such as a casino, in a private residence, or may include components that are located at different locations. The gaming devices 100 and/or mobile devices 104 may be in communication with each other and/or a central controller 40 through a data communication network 50, or remote communication link. The data communication network 50 may be a private data communication network that is operated, for example, by the gaming facility that operates the gaming devices 100, a publicly accessible data communication network such as the Internet, or a combination thereof. Communications over the data communication network 50 may be encrypted for security. The central controller 40 may be any suitable server or computing device which includes at least one processing circuit, such as a processor, and at least one memory or storage device. Each gaming device 100 and/or mobile device 104 may include a device processor circuit that transmits and receives events, messages, commands or any other suitable data or signal between the gaming device 100, the mobile device, 104, the central controller 40 and/or other components of the system 10. The device processor circuit is operable to execute such communicated events, messages or commands in conjunction with the operation of the gaming device 100 and/or mobile device 104. Moreover, the processor circuit of the central controller 40 is configured to transmit and receive events, messages, commands or any other suitable data or signal between the central controller 40 and each of the individual gaming devices 100 and/or mobile devices 104. In some embodiments, one or more of the functions of the central controller 40 may be performed by one or more device processor circuits. Moreover, in some embodiments, one or more of the functions of one or more device processor circuits as disclosed herein may be performed by the central controller 40.

A wireless access point 60 provides wireless access to the data communication network 50. The wireless access point 60 may be connected to the data communication network 50 as illustrated in FIG. 1, or may be connected directly to the central controller 40 or another server connected to the data communication network 50. In this example, the data communication network 50 may include an internal operator network 52 (e.g., a casino-gaming network), which includes the components of the system 10, and which is operated by the operator of the system 10, e.g., a casino operator.

The data communication network may also include a publicly accessible network 54, e.g., the Internet, which allows communication links 55 between the internal operator network 52 or components of the system 10 with externally located servers, systems, and/or networks, such as a third party server 90 and/or third party database 95 on an internal third party network 56 for example. In this example, the components of the system 10 communicate with the internal third party network 56 and third party server 90 via the publicly accessible network 54, but it should be understood that other arrangements, such as the internal operator network 52 communicating directly with the internal third party network 56 and third party server 90 for example, are also contemplated. In some examples, the third party server 90 may be an Internet server on the publicly accessible network 54.

One or more content servers, such as a gaming content server 70, may also be connected to the system 10 through the internal operator network 52. The gaming content server 70 may manage delivery of gaming content to the user of a gaming device 100 and/or mobile device 104. The gaming content may be stored in a gaming content database 75. The gaming content server 70 may be implemented within or separately from the central controller 40 and/or other components of the system 10.

A player tracking server 80 may also be connected through the internal operator network 52 and/or another part of the data communication network 50. The player tracking server 80 may manage a player tracking account that tracks the gameplay and spending and/or other player preferences and customizations of a player, i.e., the user of the gaming device 100 and/or mobile device 104, manages loyalty awards for the player, manages funds deposited or advanced on behalf of the player, and other functions. Player information managed by the player tracking server 80 may be stored in a player information database 85.

The gaming devices 100 and/or mobile devices 104 communicate with one or more elements of the system 10 to coordinate gaming content and other content. For example, in some embodiments, a gaming device 100 or mobile device 104 may communicate directly with another gaming device 100 or mobile device 104 over a wireless interface 62, which may be a WiFi link, a Bluetooth link, an NFC link, etc. In other embodiments, the gaming device 100 or mobile device 104 may communicate with the data communication network 50 (and devices connected thereto, including EGMs) over a wireless interface 64 with the wireless access point 60. The wireless interface 64 may include a WiFi link, a Bluetooth link, an NFC link, etc. In still further embodiments, the gaming device 100 or mobile device 104 may communicate with other devices over the wireless interface 62 and the wireless access point 60 over the wireless interface 64. In these embodiments, the wireless interface 62 and the wireless interface 64 may use different communication protocols and/or different communication resources, such as different frequencies, time slots, spreading codes, etc. For example, in some embodiments, the wireless interface 62 may be a Bluetooth link, while the wireless interface 64 may be a WiFi link.

The wireless interfaces 62, 64 allow the gaming devices 100, mobile devices 104, and/or central controller 40 to coordinate providing gaming content to the gaming devices 100 and/or mobile devices. In some embodiments, the central controller 40 and/or gaming content server 70 may coordinate the generation and display of the gaming content to more than one user and/or to more than one gaming device 100 and/or mobile device 104.

In some embodiments, the system 10 may allow a player to register a player account (e.g., a casino-gaming account such as Advantage Patron Management, and/or SPIN), using user information obtained from Internet-based social media or other accounts, which may be non-casino-gaming accounts, such as Facebook, Google, WeChat, PayPal, etc. Following successful registration of the player account, the player may access benefits of the player account at the gaming device or other device. In some examples, the player may initiate the registration by scanning an optical, machine-readable representation of code data, such as an optical code (e.g., a Quick Response (QR) code), or tapping their mobile device to an NFC or BLE terminal installed in the gaming device. If a user account associated with the mobile device is not found, the gaming device may automatically direct the mobile browser or other app of the mobile device to a registration website or portal for registration, thereby reducing friction associated with registration of the player account. Alternatively, or in addition, the registration process may be triggered by installation of an app associated with the operator, which may connect automatically to the registration website or portal.

The player tracking server 80 and/or other components of the system 10 may provide or connect to an operator website, which serves the registration website or portal, and which may handle communication with various social media accounts or other third party accounts and sites as well. The registration website may handle creation of the player account and may generate a player identification (e.g., a card ID) and may handle accessing the player account (e.g., performing card-in) to the gaming device or other device, via a scalable server for example. The registration website may also establish a path for player account messages, and may use new or existing communication infrastructure.

Figure 2:
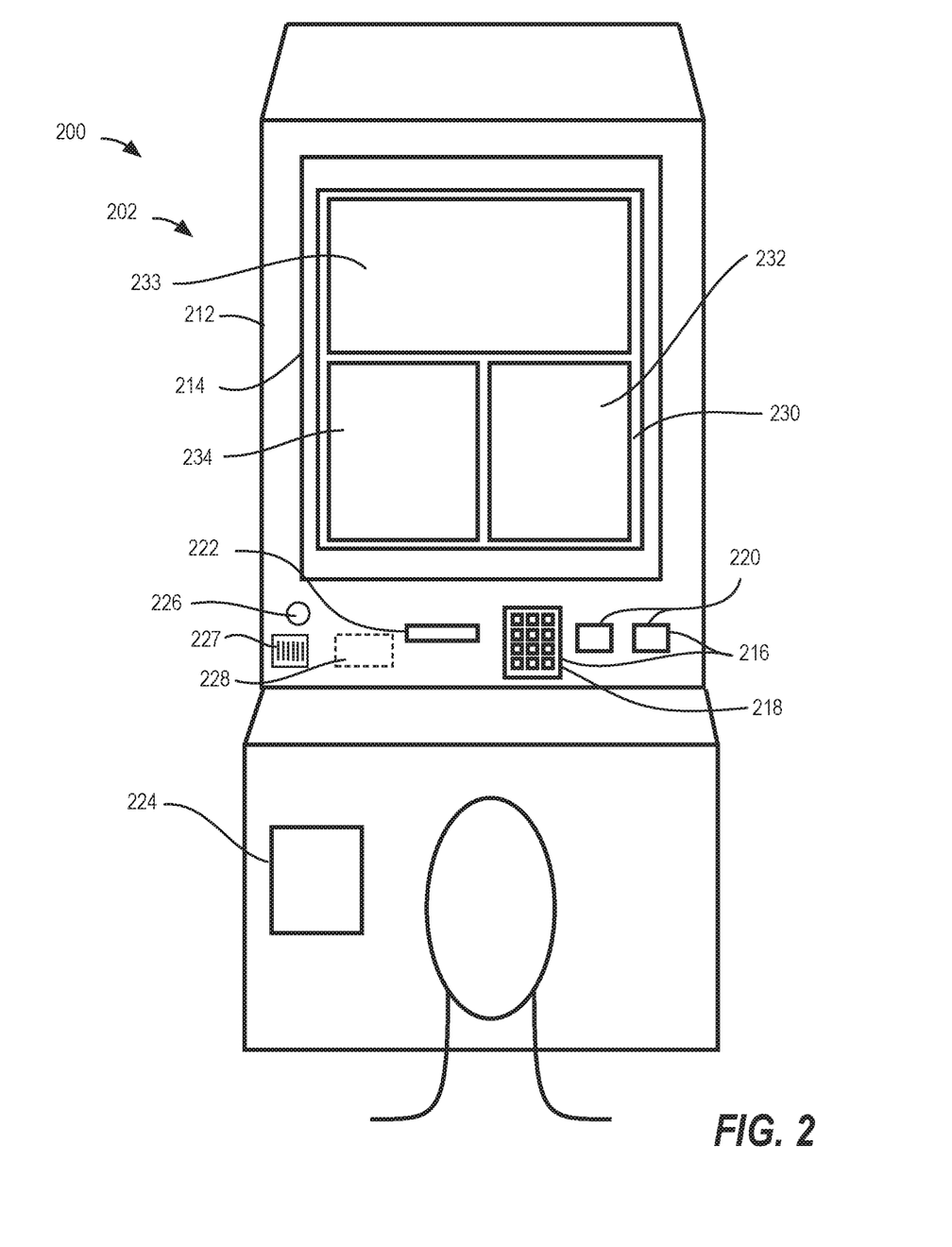
FIG. 2 illustrates an electronic gaming device for facilitating registration of a player account using a third party server, according to some embodiments.

Referring now to FIG. 2, a dedicated gaming device 200, which is an EGM 202 in this embodiment, suitable for use with the system 10 of FIG. 1 is disclosed. In this embodiment, the EGM 202 includes a housing 212 having a display device 214, and a plurality of input devices 216, such as a keypad 218, buttons 220, etc., for receiving user input for playing the wagering game and otherwise interacting with the EGM 202. In some embodiments, the display device 214 may include a touchscreen graphical user interface (GUI) 230 for receiving user input as well, such as through a virtual keyboard or virtual buttons. The GUI 230 may include an information display area 232, a gaming display area 233, a control interface area 234, and/or other areas for interacting with the GUI 230, as desired. The display device 214 may also be a single display device or may include multiple display devices, such as a first display device for displaying video of the live sporting event and a second display device for displaying gaming and wagering information for example. The EGM 202 may include additional specialized hardware as well, such as an acceptor 222, for receiving currency (i.e., bills and/or coins), tokens, credit or debit cards, or other physical items associated with monetary or other value. The EGM 202 may also include a dispenser 224, for dispensing items, such as physical items having monetary or other value (e.g., awards or prizes) or other items. The EGM 202 may also include a camera 226 and/or other type of optical scanner or reader device, and/or a medium 227 that is affixed to a gaming device operated by the casino-gaming operator and that includes the encoded identifier to be scanned by the mobile device or other device. The EGM 202 may also include a radio-frequency (RF) transceiver 228 for transmitting and/or receiving RF information to or from another medium or device.

As will be discussed in detail below, the EGM 202 may include a processor circuit and a memory coupled to the processor circuit. The memory may include machine-readable instructions that, when executed by the processor circuit, cause the processor circuit to perform operations for operating the EGM 202 and/or other features described herein.

Figure 3:
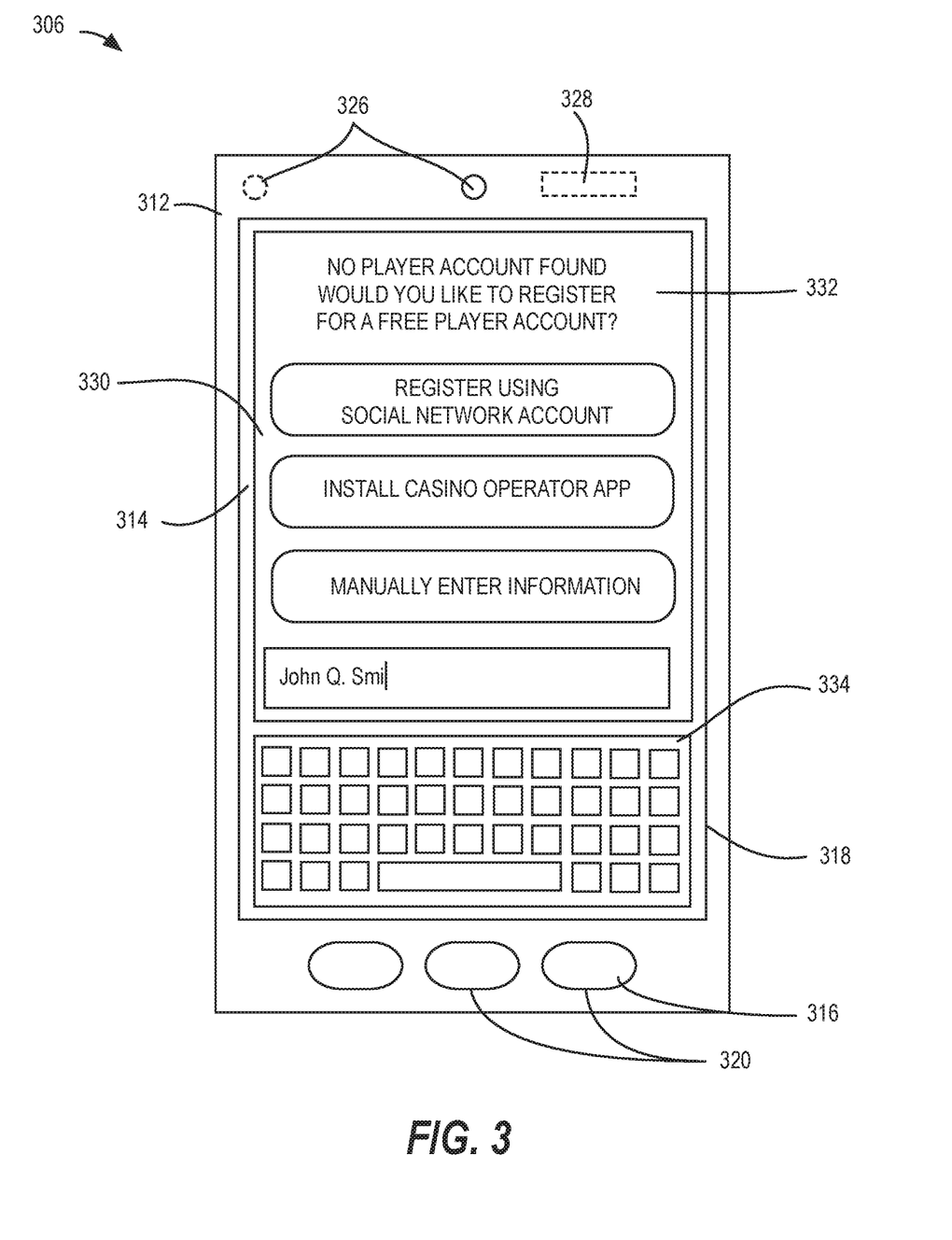
FIG. 3 illustrates a mobile device for facilitating registration of a player account using a third party server, according to some embodiments.

Referring now to FIG. 3, a mobile device 306 suitable for use with the system 10 of FIG. 1 is disclosed. In this embodiment, the mobile device 306 includes a housing 312 having a display device 314, and a plurality of input devices 316, such as buttons 320, etc., for receiving user input for playing the wagering game and otherwise interacting with the mobile device 306. In some embodiments, the display device 314 may include a touchscreen graphical user interface (GUI) 330 for receiving user input as well, such as through a virtual keyboard or keypad 318, and/or virtual buttons. The GUI 330 may include an information display area 332, a control interface area 334, and/or other areas, for interacting with the GUI 330, as desired. The display device 314 may also be a single display device or may include multiple display devices, such as a first display device for displaying video of the live sporting event and a second display device for displaying gaming and wagering information for example. The mobile device 306 may also include one or more front or rear-facing cameras 326 and/or other type of optical scanning or reading device, and may also include a radio-frequency (RF) transceiver 328 for transmitting and/or receiving RF information to or from another medium or device.

As will be discussed in detail below, the mobile device 306 may include a processor circuit and a memory coupled to the processor circuit. The memory may include machine-readable instructions that, when executed by the processor circuit, cause the processor circuit to perform operations for operating the EGM 202 and/or other features described herein.

Figure 4:
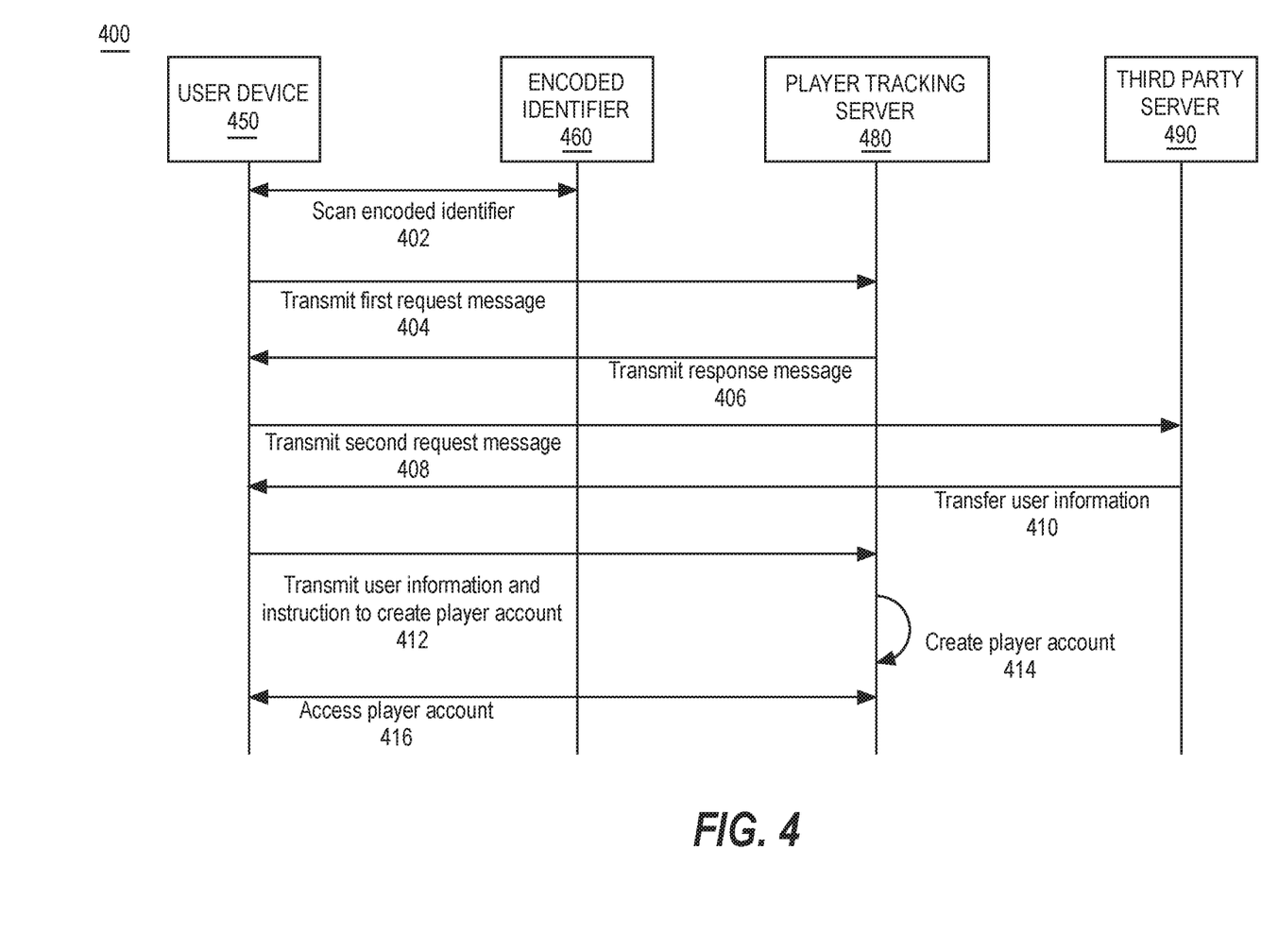
FIG. 4 is a communication diagram illustrating operations for facilitating registration of a player account using a user device, such as a gaming device or mobile device, a player tracking server, and a third party server is illustrated, according to some embodiments.

Referring now to FIG. 4, a communication diagram illustrating operations 400 between a user device 450, such as a gaming device or mobile device, a player tracking server 480, and a third party server 490 is illustrated, according to an embodiment.

The operations 400 include scanning, by a scanner device of the user device 450, an encoded identifier 460 comprising a uniform resource locator (URL) associated with the player tracking server 480 (Operation 402). The user device 450 transmits a first request message to the player tracking server 480 based on the URL (Operation 404). The first request message includes a request to access a player account of a player, and the player tracking server 480 transmits a response message to the user device 450 based on the first request message (Operation 406). If the player tracking server 480 determines that the player account does not exist, the response message indicates that the player account does not exist. The user device 450 then transmits a second request message the third party server 490, which is operated by a third party provider (Operation 408). This may be in response to a player input, which may be provided by the player in response to the response message indicating that the player account does not exist, or may be automatically transmitted in response to the response message indicating that the player account does not exist, for example. The second request message includes a request to access a user account associated with the player, and includes an instruction to transfer user information associated with the user account from the third party server 490 to the user device 450. The third party server 490 transfers the user information to the user device 450 (Operation 410), and the user device transmits an account registration message to the player tracking server 480 that includes the user information and an instruction to create a new player account associated with the player, e.g., by populating the new player account with the user information (Operation 412). The player may also manually edit the information before creating the new player account and/or enter additional required information not provided by the third party server 490. In some examples, the user information may not contain all of the information required to register for a player account, so the user may be prompted to enter some additional information. For, example, if the player wants to register for a digital wallet, the user information may provide the player's name, birthdate, and mailing address, but might not provide additional information that may be required for creating a digital wallet, such as a social security number for example. The player tracking server 480 then creates the new player account using the user information (Operation 414) and the user device 450 accesses the player account (Operation 416).

Figure 5:
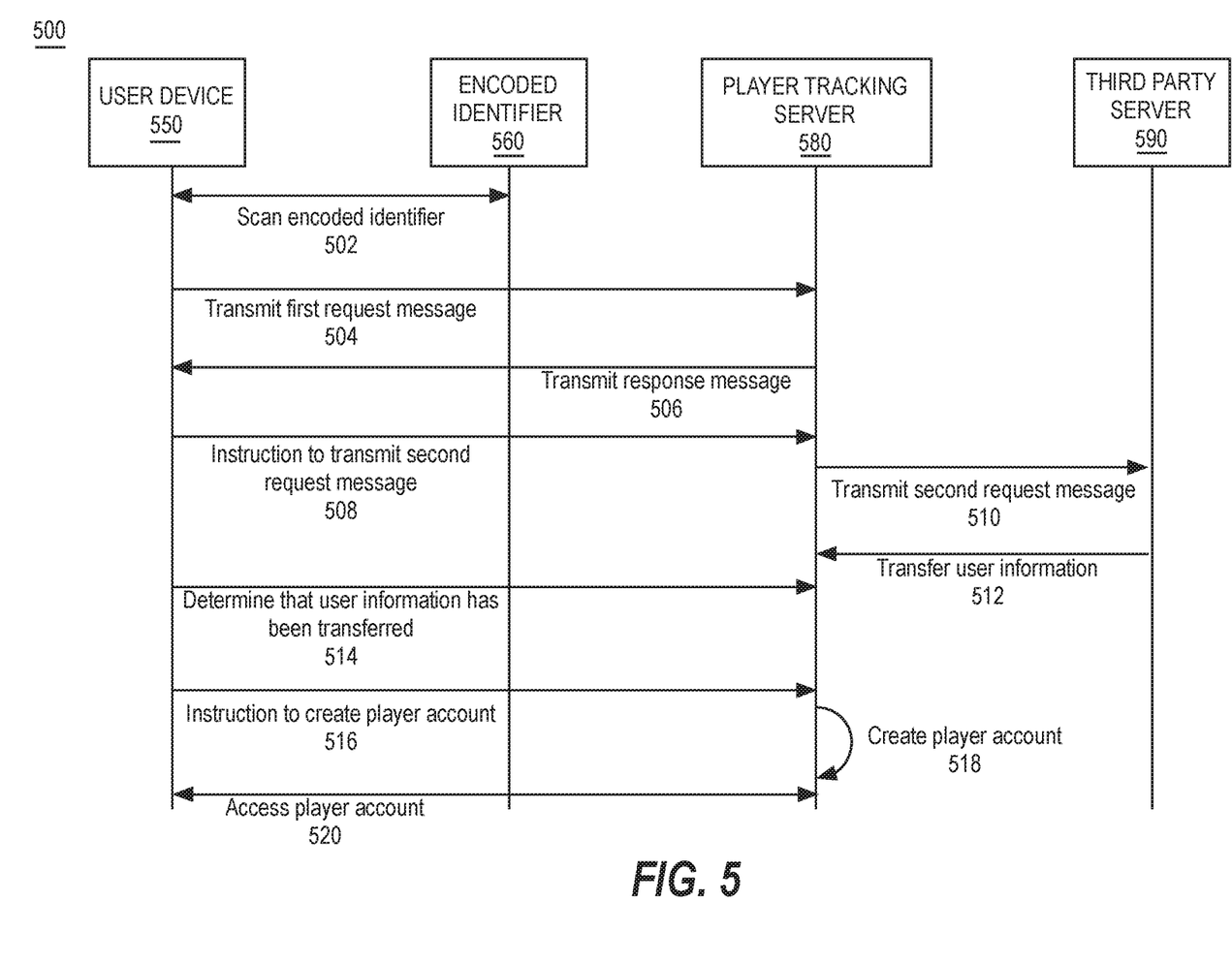
FIG. 5 is a communication diagram illustrating operations for facilitating registration of a player account using a user device, such as a gaming device or mobile device, a player tracking server, and a third party server is illustrated, according to some embodiments.

Different third party accounts may have different protocols for interacting with outside systems. For example, to obtain user information from some social medial accounts, such as WeChat, for example, a mobile device may communicate directly with the third party server, and may then include the obtained user information as part of the account registration message for registering the player account with the player tracking server or other component of the gaming system. In other embodiments, to obtain user information from social media and other accounts such as Google, Facebook, PayPal, etc., a mobile device communicates with the player tracking server to initiate the retrieval of user information, and the player tracking server communicates directly with the third party server to obtain the user information. In this regard, FIG. 5 is a communication diagram illustrating operations 500 between a user device 550, such as a gaming device or mobile device, a player tracking server 580, and a third party server 590 is illustrated, according to another embodiment.

The operations 500 include scanning, by a scanner device of the user device 550, an encoded identifier 560 comprising a uniform resource locator (URL) associated with the player tracking server 580 (Operation 502). The user device 550 transmits a first request message to the player tracking server 580 based on the URL (Operation 504). The first request message includes a request to access a player account of a player, and the player tracking server 580 transmits a response message to the user device 550 based on the first request message (Operation 506). If the player tracking server 580 determines that the player account does not exist, the response message indicates that the player account does not exist. The user device 550 instructs the player tracking server 580 to transmit a second request message to the third party server 590, which is operated by a third party provider (Operation 508). As noted above, this may be in response to player input, or may be automatic based on the response message, as desired. The player tracking server 580 transmits the second request message to the third party server 590 (Operation 510), which includes a request to access a user account associated with the player, and includes an instruction to transfer user information associated with the user account from the third party server 590 to the player tracking server 580. The third party server 590 transfers the user information to the player tracking server 580 (Operation 512). The user device 550 may also determine that the third party server 590 has transferred the user information to the player tracking server 580 (Operation 514), and may also transmit an account registration message to the player tracking server 580 that includes an instruction to create a new player account associated with the player based on the user information (Operation 516). The player tracking server 580 creates the new player account using the user information, e.g., by populating the new player account with the user information (Operation 518) and the user device 550 accesses the player account (Operation 520). The player tracking server 580 may also transmit a message to start a player session, e.g., at the user device 550 or another device (such as an EGM for example). The player tracking server 580 may also instruct the user device 550 or other device to store or otherwise persist an identifier (e.g., a cookie) associated with the player's account so that the player is not required to re-authenticate for a predetermined period of time after registration.

In some examples, the player may initiate account registration by activating an option on a gaming device service window to display a machine-readable code (e.g., a QR code). The code may contain an URL pointing to the third party server (e.g., when using WeChat), or to an operator website (e.g., when using Facebook, Google, PayPal, etc.). The player may scan the code with his mobile device, and the phone will open the URL in a browser or other app on the device, which then facilitates the retrieval of user information from the third party account. In another example, the player may tap his mobile device to an RF device sorting or providing an RF code (e.g., an NFC or other RF tag storing or providing an NFC or other RF code) to obtain the URL and initiate registration, or the mobile device may background scan for NFC or other tags in proximity to the mobile device automatically. The gaming system may first determine whether the mobile device is already associated with a player account before initiating registration. The gaming system may also include the option to enter the user information manually, as an additional option for the player. Following account registration, the player may be carded into the gaming device. To facilitate future logins, a browser cookie or other credential may be stored in the memory of the gaming device or user device to facilitate subsequent authentication of the user account. Alternatively, or in addition, registration information may be stored in a wallet app on the mobile device (such as Apple Wallet or Google Pay).

To scan a QR code, the player must have installed a QR code scanning app. In some regions, QR codes are widely used. For example, the Social network, WeChat, widely used in China, makes extensive use of QR codes so players in many Asian countries may be familiar with them and already have a QR scanning app installed on their mobile devices. To login with a QR code, the player presses a button on the gaming machine service window to display a limited lifetime QR code which encodes a URL. The player scans this QR code with the QR code scanning app on their mobile device.

In some embodiments, the URL may return a web page that may include a description of the player account and benefits, links to installing the operator's app on the mobile device, a link to a manual registration page, a link to a lookup page for players who already have a player account in the operator's player tracking system, and/or one or more links to enable the player to register for a player tracking loyalty account using a social network account or other third party account.

In some embodiments, if the player chooses to register manually, a page may be provided for the player to enter user information (e.g., name, address, and other contact information), after which the operator website creates a new account in the player tracking system, issues a card identifier, and sends that card ID to the initiating gaming device to card-in the player and track their play to earn points and other compensations. If the player chooses the lookup page because they already have a loyalty account, they enter some personally identifiable information about themselves, such as name, address, phone number. The operator website may also send an activation code to their email address or phone number (via SMS text, messaging app, etc.). The player may enter the activation code into the web page and submits it to the operator website which sends their card ID to the initiating gaming device.

If the player chooses to register via a social network or other third party account, their mobile device is directed to the selected social network (e.g., directly or via the operator website), where they authenticate using the credentials appropriate to the third party account, to authorize the release of information to complete the registration with the operator's player tracking system. Upon authorization, the player's browser is redirected back to the operator website where the information from the third party account is used to create an account in the operator's player tracking system, issue a card ID, and the card ID is sent to the initiating gaming machine.

Upon completion of the registration process, the operator website may return a browser cookie which is stored in the player's mobile device. Scanning the QR code or tapping to the NFC terminal at a later time causes the player's mobile device browser to be launched again, but in this example, the presence of the browser cookie for that operator enterprise causes the operator website to skip the registration step and proceed directly to sending the player's card ID to the initiating gaming device. In some examples, the player tracking server may provide the player with a digital pass for the player's mobile wallet, e.g., an NFC-enabled pass for Apple Wallet or Google Wallet, etc.).

In some examples, the EGM or other device may include an RF transceiver, e.g., an NFC transceiver. For example, the NFC transceiver of the EGM may first attempt to retrieve user information from the user device, to avoid the need to query a third party server to retrieve the user information. If the user information is not available, the NFC transceiver may be reconfigured to appear as an NFC tag to the user device, which scans and receives the URL to facilitate logging into the player's account and/or creating a new account.

If the player chooses to install the operator mobile app, the installation process may register the URL of the Operator website with the mobile device's operating system. When that URL is encountered again (e.g., by QR code scan or NFC tap), the mobile device's operating system may launch the operator's mobile app instead of the browser. The mobile app may then create a direct connection to the gaming machine via BLE, Wi-Fi, etc., and card-in the player. In some examples, the URL may contain information required to create a secure connection to the EGM over BLE, Wifi, etc. With the operator's mobile app, the player may access other features directly on their mobile device such as the ability to initiate transfers between the gaming machine and their casino-gaming wallet, and perform other interactions with the operator's system.

Figure 6:
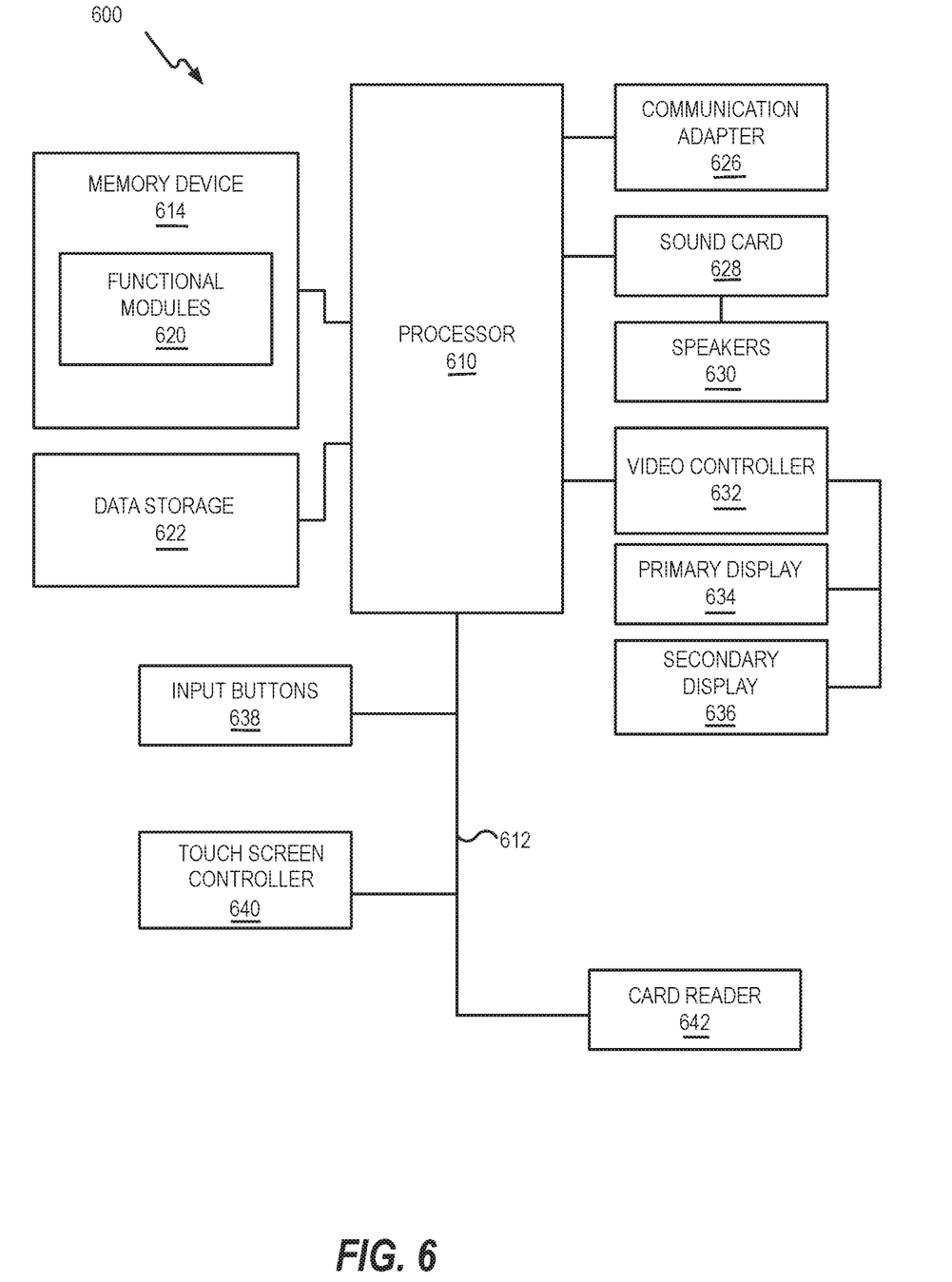
FIG. 6 is a schematic block diagram illustrating various components of a computing device according to some embodiments.

Referring now to FIG. 6, a block diagram that illustrates various components of a computing device 600, which may embody or be included as part of the devices, systems, and/or components above, according to some embodiments. As shown in FIG. 6, the computing device 600 may include a processor circuit 610 that controls operations of the computing device 600. Although illustrated as a single processor, multiple special purpose and/or general-purpose processors and/or processor cores may be provided in the computing device 600. For example, the computing device 600 may include one or more of a video processor, a signal processor, a sound processor and/or a communication controller that performs one or more control functions within the computing device 600. The processor circuit 610 may be variously referred to as a "controller," "microcontroller," "microprocessor" or simply a "computer." The processor circuit 610 may further include one or more application-specific integrated circuits (ASICs).

Various components of the computing device 600 are illustrated in FIG. 6 as being connected to the processor circuit 610. It will be appreciated that the components may be connected to the processor circuit 610 and/or each other through one or more busses 612 including a system bus, a communication bus and controller, such as a USB controller and USB bus, a network interface, or any other suitable type of connection.

The computing device 600 further includes a memory device 614 that stores one or more functional modules 620 for performing the operations described above. Alternatively, or in addition, some of the operations described above may be performed by other devices connected to the network, such as the network 50 of the system 10 of FIG. 1, for example. The computing device 600 may communicate with other devices connected to the network to facilitate performance of some of these operations. For example, the computing device 600 may communicate and coordinate with certain displays to identify elements of a race being displayed by a particular display.

The memory device 614 may store program code and instructions, executable by the processor circuit 610, to control the computing device 600. The memory device 614 may include random access memory (RAM), which can include non-volatile RAM (NVRAM), magnetic RAM (ARAM), ferroelectric RAM (FeRAM) and other forms as commonly understood in the gaming industry. In some embodiments, the memory device 614 may include read only memory (ROM). In some embodiments, the memory device 614 may include flash memory and/or EEPROM (electrically erasable programmable read only memory).

Any other suitable magnetic, optical and/or semiconductor memory, such an internal or external data storage 622, may operate in conjunction with the gaming device disclosed herein.

The computing device 600 may include a communication adapter 626 that enables the computing device 600 to communicate with remote devices, such as the wireless network, another computing device 600, and/or a wireless access point, over a wired and/or wireless communication network, such as a local area network (LAN), wide area network (WAN), cellular communication network, or other data communication network, e.g., the network 50 of FIG. 1.

The computing device 600 may include one or more internal or external communication ports that enable the processor circuit 610 to communicate with and to operate with internal or external peripheral devices, such as a sound card 628 and speakers 630, video controllers 632, a primary display 634, a secondary display 636, input buttons 638 or other devices such as switches, keyboards, pointer devices, and/or keypads, a touch screen controller 640, a card reader 642, currency acceptors and/or dispensers, cameras, sensors such as motion sensors, mass storage devices, microphones, haptic feedback devices, and/or wireless communication devices. In some embodiments, internal or external peripheral devices may communicate with the processor through a universal serial bus (USB) hub (not shown) connected to the processor circuit 610. Although illustrated as being integrated with the computing device 600, any of the components therein may be external to the computing device 600 and may be communicatively coupled thereto. Although not illustrated, the computing device 600 may further include a rechargeable and/or replaceable power device and/or power connection to a main power supply, such as a building power supply.

In some embodiments, the computing device 600 may include a head mounted device (HMD) and may include optional wearable add-ons that include one or more sensors and/or actuators. Including ones of those discussed herein. The computing device 600 may be a head-mounted mixed-reality device configured to provide mixed reality elements as part of a real-world scene being viewed by the user wearing the computing device 600.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks. The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system for registering a player account, the system comprising:
a processor circuit; and
a memory coupled to the processor circuit, the memory comprising machine-readable instructions that, when executed by the processor circuit, cause the processor circuit to:
receive, from a scanner device, an encoded identifier comprising a uniform resource locator (URL) associated with a first server;
transmit a first request message to the first server based on the URL, the first request message comprising a request to access a player account of a player;
receive a response message from the first server;
in response to the response message indicating that the player account does not exist, receive player input indicative of a request to access a user account associated with the player;
based on the player input, cause a second request message to be transmitted to a second server operated by a third party provider to access the user account, the second request message comprising an instruction to transfer user information associated with the user account from the second server to the first server;
based in part on the transfer of the user information to the first server, transmit an account registration message to the first server, the account registration message comprising an instruction to create a new player account associated with the player; and
based on creation of the new player account, access the player account.

2. The system for registering the player account of claim 1, wherein the machine-readable instructions that cause the second request message to be transmitted to the second server further comprise an instruction for the processor circuit to transmit the second request message from the processor circuit to the second server through a network.

3. The system for registering the player account of claim 2, wherein the second request message comprises an instruction to transmit the user information to the processor circuit through the network, and
wherein the machine-readable instructions further cause the processor circuit to:
receive the user information from the second server; and
transmit the account registration message to the first server through the network, wherein the account registration message comprises the user information and an instruction to populate the new player account with the user information.

4. The system for registering the player account of claim 1, wherein the machine-readable instructions that cause the second request message to be transmitted to the second server further comprise an instruction for the processor circuit to instruct the first server to transmit the second request message to the second server through a network.

5. The system for registering the player account of claim 4, wherein the second request message comprises an instruction to transmit the user information to the first server through the network.

6. The system for registering the player account of claim 5, wherein the machine-readable instructions further cause the processor circuit to:
determine that second server has transferred the user information to the first server; and
transmit the account registration message to the first server through the network, wherein the account registration message comprises an instruction to populate the new player account with the user information.

7. The system for registering the player account of claim 1, wherein the scanner device comprises an optical scanner device, and
wherein the machine-readable instructions further cause the optical scanner device to:
read an optical, machine-readable representation of code data comprising the encoded identifier; and
provide the encoded identifier to the processor circuit.

8. The system for registering the player account of claim 1, wherein the scanner device comprises a radio-frequency (RF) transceiver, and
wherein the machine-readable instructions further cause the RF transceiver to retrieve an RF code from an RF tag comprising the encoded identifier; and
provide the encoded identifier to the processor circuit.

9. The system for registering the player account of claim 8, wherein the RF tag comprises a second RF transceiver, and
wherein the machine-readable instructions that cause the RF transceiver retrieve the RF code from the RF tag further comprise instructions to:
receive a request for the user information from the second RF transceiver;
transmit a message indicating that the user information is not available, wherein the message causes the second RF transceiver to provide the RF code; and
retrieve the RF code from the second RF transceiver.

10. The system for registering the player account of claim 1, wherein the new player account comprises a casino-gaming account associated with an operator of the first server, and
wherein the user account comprises a non-casino-gaming account that is not associated with the operator of the first server.

11. The system for registering the player account of claim 10, wherein the user account comprises an Internet social media account.

12. The system for registering the player account of claim 10, wherein the encoded identifier is encoded on a medium that is affixed to a gaming device operated by the operator.

13. The system for registering the player account of claim 10, wherein the first server comprises a player tracking server that is part of a casino-gaming network operated by the operator, and
wherein the second server is an Internet server that is not part of the casino-gaming network.

14. The system for registering the player account of claim 1, wherein the machine-readable instructions that cause the processor circuit to access the user account further cause the processor circuit to cause a credential to be stored in the memory to facilitate subsequent authentication of the user account.

15. A method for registering a player account, the method comprising:
scanning, by a scanning device of a mobile device associated with a player, an encoded identifier comprising a uniform resource locator (URL) associated with a first server;
transmitting, by the mobile device, a first request message to the first server based on the URL, the first request message comprising a request to access a player account of the player;
receiving, by the mobile device, a response message from the first server;
in response to the response message indicating that the player account does not exist, transmitting a second request message to a second server operated by a third party provider to access a user account associated with the player, the second request message comprising an instruction to transfer user information associated with the user account from the second server to the first server;
based in part on the transfer of the user information to the first server, transmitting, by the mobile device, an account registration message to the first server, the account registration message comprising an instruction to create a new player account associated with the player; and
based on creation of the new player account, accessing the player account by the mobile device.

16. A system for registering a player account, the system comprising:
a first server comprising:
a processor circuit; and
a memory coupled to the processor circuit, the memory comprising machine-readable instructions that, when executed by the processor circuit, cause the processor circuit to:
receive a first request message from a mobile device, the first request message comprising a request to access a player account of a player, wherein the first request message is associated with an encoded identifier comprising a uniform resource locator (URL) that has been scanned by a scanner device of the mobile device;
transmit a response message to the mobile device indicating that the player account does not exist;
receive user information from a second server operated by a third party provider, wherein the user information is associated with a user account associated with the player;
receive the user information from the second server;
receive an account registration message from the mobile device, the account registration message comprising an instruction to create a new player account associated with the player; and
create the new player account based in part on the user information.

17. The system for registering the player account of claim 16, wherein the machine-readable instructions that cause the processor circuit to receive the user information further cause the processor circuit to:
receive the user information from the second server in response to the second server receiving a second request message from the mobile device, the second request message comprising an instruction to transmit the user information from the second server to the first server.

18. The system for registering the player account of claim 16, wherein the machine-readable instructions that cause the processor circuit to receive the user information further cause the processor circuit to:
receive an instruction from the mobile device to request the user information from the second server; and
transmit a second request message to the second server, the second request message comprising an instruction to transmit the user information from the second server to the first server.

19. The system for registering the player account of claim 16, wherein the new player account comprises a casino-gaming account associated with an operator of the first server, and wherein the user account comprises a non-casino-gaming account that is not associated with the operator of the first server.

20. The system for registering the player account of claim 19, wherein the first server comprises a player tracking server that is part of a casino-gaming network operated by the operator, and
wherein the second server is an Internet server that is not part of the casino-gaming network.

* * * * *